United States Patent
Herrin et al.

(10) Patent No.: US 10,901,876 B2
(45) Date of Patent: *Jan. 26, 2021

(54) PROVIDING COGNITIVE INTELLIGENCE ACROSS CONTINUOUS DELIVERY PIPELINE DATA

(71) Applicant: International Business Machines Corporation, Armonk, NY (US)

(72) Inventors: Bradley C. Herrin, Austin, TX (US); Alexander Sobran, Chapel Hill, NC (US); Bo Zhang, Cary, NC (US); Xianjun Zhu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/689,804

(22) Filed: Nov. 20, 2019

(65) Prior Publication Data

US 2020/0110693 A1  Apr. 9, 2020

Related U.S. Application Data

(63) Continuation of application No. 16/155,711, filed on Oct. 9, 2018, now Pat. No. 10,565,093.

(51) Int. Cl.
*G06F 9/44* (2018.01)
*G06F 11/36* (2006.01)
(Continued)

(52) U.S. Cl.
CPC ............ *G06F 11/3664* (2013.01); *G06F 8/60* (2013.01); *G06F 8/77* (2013.01); *G06N 20/00* (2019.01)

(58) Field of Classification Search
CPC ....................................................... G06F 9/44
See application file for complete search history.

(56) References Cited

U.S. PATENT DOCUMENTS 9,183,123 B2  11/2015 Spektor et al.
9,612,821 B2   4/2017 Iyer et al.
(Continued)

FOREIGN PATENT DOCUMENTS

WO   2017201479 A1   11/2017

OTHER PUBLICATIONS

List of IBM Patents or Patent Applications Treated as Related, Nov. 27, 2019, pp. 1-2.
(Continued)

*Primary Examiner* — Jae U Jeon
(74) *Attorney, Agent, or Firm* — Robert A. Voigt, Jr.; Winstead PC

(57) ABSTRACT

A method, system and computer program product for detecting potential failures in a continuous delivery pipeline. A machine learning model is created to predict whether changed portion of codes under development at various stages of the continuous delivery pipeline will result in a pipeline failure. After creating the machine learning model, log file(s) may be received that were generated by development tool(s) concerning a changed portion of code under development at a particular stage of the continuous delivery pipeline. The machine learning model provides relationship information between the log file(s) and the changed portion of code. A message is then generated and displayed based on this relationship information, where the message may provide a prediction or a recommendation concerning potential failures in the continuous delivery pipeline. In this manner, the potential failures in the continuous delivery pipeline may be prevented without requiring context switching.

20 Claims, 4 Drawing Sheets

(51) Int. Cl.
*G06F 8/77* (2018.01)
*G06F 8/60* (2018.01)
*G06N 20/00* (2019.01)

(56) References Cited

U.S. PATENT DOCUMENTS

| | | | |
|---|---|---|---|
| 2001/0020267 A1* | 9/2001 | Koino | G06F 9/3844 712/239 |
| 2006/0156286 A1 | 7/2006 | Morgan et al. | |
| 2007/0277130 A1* | 11/2007 | Lavelle | G01R 31/318314 716/107 |
| 2015/0082277 A1 | 3/2015 | Champlin-Scharff et al. | |
| 2017/0003948 A1 | 1/2017 | Iyer et al. | |
| 2017/0212829 A1 | 7/2017 | Bales et al. | |
| 2017/0371629 A1 | 12/2017 | Chacko et al. | |
| 2019/0227793 A1* | 7/2019 | Ramasamy | G06Q 10/06398 |

OTHER PUBLICATIONS

Atom, "Linter-Jenkins," https://atom.io/packages/linter-jenkins, 2018, pp. 1-2.
Atom, "Concourse CI YAML Editor for Atom," https://atom.io/packages/concourse-pipeline-yaml, 2018, pp. 1-3.
Microsoft et al., "Pipeline Model to Formalize Extensibility Points of Tools," IP.com, IP.com No. IPCOM000159156D, Oct. 10, 2017, pp. 1-6.
Goenka et al., "Method and System for Running Integration Tests on Pull Requests," IP.com, IP.com No. IPCOM000251881D, Dec. 8, 2017, pp. 1-3.
Anonymous, "Optimise Dependency Installations for Microservice Solutions," IP.com, IP.com No. IPCOM000252740D, Feb. 6, 2018, pp. 1-3.
Cisco, "Cisco CloudCenter Solution: Optimize DevOps and Continuous Delivery," White Paper, 2017, pp. 1-10.

\* cited by examiner

PROVIDING COGNITIVE INTELLIGENCE ACROSS CONTINUOUS DELIVERY PIPELINE DATA

TECHNICAL FIELD

The present invention relates generally to continuous delivery, and more particularly to providing cognitive intelligence across continuous delivery pipeline data.

BACKGROUND

Continuous delivery is a software engineering approach in which teams produce software in short cycles, ensuring that the software can be reliably released at any time. It aims at building, testing, and releasing software with greater speed and frequency. The approach helps reduce the cost, time, and risk of delivering changes by allowing for more incremental updates to applications in production. A straightforward and repeatable deployment process is important for continuous delivery.

Continuous delivery is enabled through the deployment pipeline. That is, the continuous delivery pipeline enables a constant flow of changes into production via an automated software production line.

The pipeline breaks down the software delivery process into stages, such as build and test. Each stage is aimed at verifying the quality of new features from a different angle to validate the new functionality and prevent errors from affecting the software. The pipeline should provide feedback to the team and visibility into the flow of changes to everyone involved in delivering the new feature/s.

Currently, there are many layers in which a failure in the continuous delivery pipeline can occur, such as the application level, container environment, virtual host, hypervisor, storage, network, etc. Code is used in the form of various languages and application programming interfaces (APIs) that orchestrate the sequences of the continuous delivery pipelines. As projects mature, the layers of integration, orchestration code and dependencies between layers becomes more complex as quality gates (check on a code quality fact that must be enforced before releasing and committing to a source control) are introduced. The dependencies intertwined between layers of infrastructure code, application code and framework code grow more complex where changes of code at any of these levels can strongly influence the quality of the project as well as its delivery.

Modern software pipeline development environments attempt to prevent failures in the continuous delivery pipeline by controlling all actions of the pipeline sequences through code, tool frameworks enabled through API services, quality gates and monitoring frameworks. As a result, in order to attempt to limit the failures in the continuous delivery pipeline, developers utilize context switching between multiple environments, such as an integrated development environment and a text editor. Furthermore, in an attempt to limit the failures in the continuous delivery pipeline, developers are required to possess intricate knowledge of all pipeline stages, tools, APIs, architecture, historical failures and historical root cause analysis investigations, etc.

As a result, there is not currently a means for effectively limiting the failures in the continuous delivery pipeline.

SUMMARY

In one embodiment of the present invention, a method for detecting potential failures in a continuous delivery pipeline comprises creating a machine learning model to predict whether changed portions of code under development at various stages of the continuous delivery pipeline will result in a pipeline failure. The method further comprises receiving a changed portion of code under development at a particular stage of the continuous delivery pipeline. The method additionally comprises receiving one or more log files generated by one or more development tools involving the changed portion of code under development at the particular stage of the continuous delivery pipeline. Furthermore, the method comprises receiving relationship information between entries in the one or more log files and the changed portion of code under development at the particular stage of continuous delivery pipeline from the machine learning model, where the relationship information comprises information pertaining to the behavior of the changed portion of code in connection with the particular stage of continuous delivery pipeline. Additionally, the method comprises generating and displaying a message based on the received relationship information, where the message comprises a prediction or a recommendation concerning potential failures in the continuous delivery pipeline.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
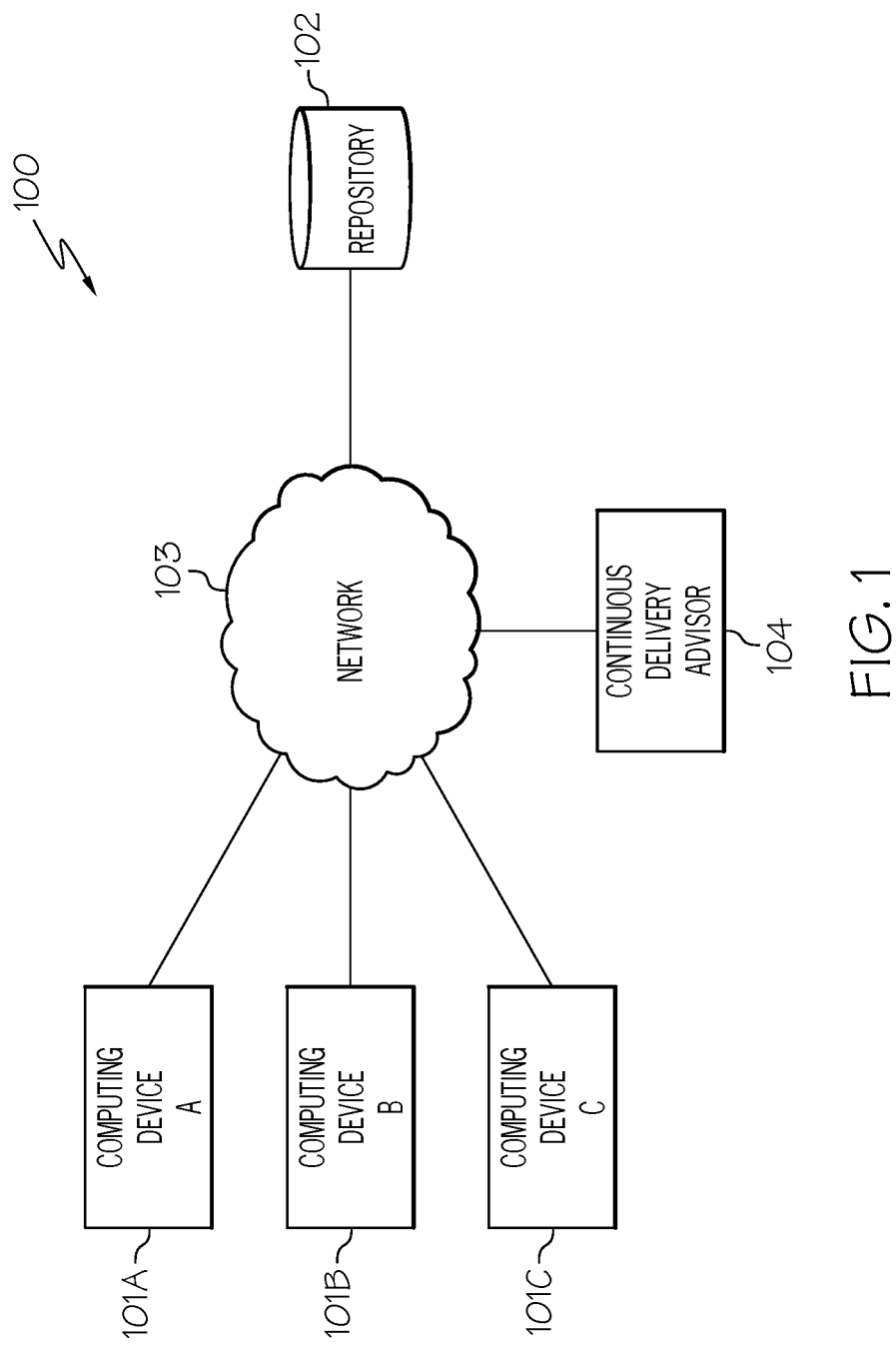
FIG. 1 illustrates a communication system for practicing the principles of the present invention in accordance with an embodiment of the present invention.

The present invention comprises a method, system and computer program product for detecting potential failures in a continuous delivery pipeline. In one embodiment of the present invention, a machine learning model is created to predict whether changed portions of code under development at various stages of the continuous delivery pipeline will result in a pipeline failure. The machine learning model may be created based on analyzing log files that were generated by development tools that may have been discovered by monitoring the web browsing activities of the developers. After creating the machine learning model, log file(s) may be received that were generated by development tool(s) concerning a changed portion of code under development at a particular stage of the continuous delivery pipeline. The machine learning model provides relationship information between the entries in the log file(s) and the changed portion of code under development at the particular stage of the continuous delivery pipeline. A message is then generated and displayed based on the received relationship information between a log entry in a log file and the changed portion of code, where the message may provide a prediction or a recommendation concerning potential failures in the continuous delivery pipeline. In this manner, the potential failures in the continuous delivery pipeline may be prevented without requiring context switching and human layer debugging and investigation across the software delivery pipeline to detect and limit potential failures.

Embodiments of the present invention provide cognitive intelligence across the pipeline data to remove the developer's need for context switching as well as intricate knowledge of all pipeline stages, tools, APIs, architectures, historical failures, and historical analysis investigations.

Additionally, embodiments of the present invention remove the required context switching and human layer debugging and investigation across the software delivery pipeline to detect and limit potential failures. Instead, a single pane dynamic editor is used that operates pre-commit with real-time knowledge of the pipeline's sequence, quality gate thresholds, infrastructure layer dependencies, and other project developer's branch commits, test thresholds and dependencies. That is, embodiments of the present invention provide real-time knowledge across the continuous delivery pipeline to a single pane editor as a cognitive software pipeline linter (tool to flag programing errors, bugs, stylistic errors, suspicious constructs, etc.).

Embodiments of the present invention reduce context switching and apply machine learning through a linter tool that has knowledge of the pipeline sequence and the construct of the infrastructure code layers so that a single pane dynamic text editor augments and content assists a developer based on the type of code being edited in its statistical relationship to their pipeline and product architecture.

Furthermore, embodiments of the present invention provide software linting (tool to flag programing errors, bugs, stylistic errors, suspicious constructs, etc.) that understands the quality gates of the software delivery pipeline, and, therefore enforces code creation, recommendation, and editing based on the layer of the proposed change and its requirements to meet a quality gate before delivering and waiting on a programmatic gate to approve or deny. For example, the linter may recognize that a change in the code requires a Jest unit test (library for testing JavaScript® code) and level of coverage on this new component and therefore generates it and shows a coverage result based on the developer's standards of acceptance based on the code quality gates. Furthermore, recommendations may be provided to provide fixes to ensure that the level of code quality is met before the change is ever committed.

Additionally, embodiments of the present invention provide software linting that warns of alterations to previously deployed code to correct pipeline failures that other developers in other branches are working to resolve. Furthermore, embodiments of the software linter of the present invention understand other development branches in the developer's active commits and warns how they may alter overall code quality, unit tests, functional tests and performance tests.

Furthermore, embodiments of the present invention build a historical relationship between commit diffs (shows the difference between that commit's ancestor and the commit), issue tracking systems, environment changes, file storage repositories, system logs, monitoring logs and deployments logs with applied machine learning in order to bring the knowledge learned in real-time across the pipeline and software development lifecycle to the editor as an intelligent software pipeline linter.

As a result of the present invention, real-time programming problems as well as system integration problems are solved at the developer workspace by removing the context switching and segregation of pipeline sequences, thresholds, quality gates, architectures, logging, and monitoring for individualized investigations and reducing them into a single page and frame of a dynamic text editor.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates an embodiment of the present invention of a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to a repository 102 via a network 103. Computing devices 101A-101C may collectively or individually be referred to as computing devices 101 or computing device 101, respectively. It is noted that both computing devices 101 and the users of computing devices 101 may be identified with element number 101.

Users of computing devices 101 may correspond to the developers, testers, operations engineers, etc. that are members of a team(s) involved in producing software. Such members may produce software using software engineering approaches referred to as "continuous integration" and "continuous delivery." Continuous integration is a software development practice in which small adjustments to the underlying code in an application are tested every time a team member makes changes. In a continuous integration environment, developers (e.g., users of computing devices 101) merge their code changes in a shared repository 102 several times a day so that it can be committed, tested, and validated continuously. That is, when developers (e.g., users of computing devices 101) are finished making changes to an application, they commit their code to a shared repository 102 which will then integrate their snippet with the central code base.

In the same vein, the practice of continuous delivery further extends continuous integration by making sure the software checked in on the mainline is always in a state that can be deployed to users and makes the actual deployment process very rapid. Continuous delivery is a software engineering approach in which teams produce software in short cycles, ensuring that the software can be reliably released at any time. It aims at building, testing, and releasing software with greater speed and frequency. The approach helps reduce the cost, time, and risk of delivering changes by allowing for more incremental updates to applications in production. A straightforward and repeatable deployment process is important for continuous delivery.

Continuous delivery is enabled through the deployment pipeline. That is, the continuous delivery pipeline enables a constant flow of changes into production via an automated software production line. The pipeline breaks down the software delivery process into stages, such as build and test. Each stage is aimed at verifying the quality of new features from a different angle to validate the new functionality and prevent errors from affecting the software. The pipeline should provide feedback to the team and visibility into the flow of changes to everyone involved in delivering the new feature(s).

Referring to FIG. 1, computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and repository 102.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes what is referred to herein as a "continuous delivery advisor" 104 connected to network 103 by wire or wirelessly. Continuous delivery advisor 104 is configured to provide cognitive intelligence across continuous delivery pipeline data effectively thereby limiting the failures in the continuous delivery pipeline without the previously required context switching and human layer debugging and investigation across the software delivery pipeline to detect and limit potential failures. A more detailed description of continuous delivery advisor 104 providing cognitive intelligence across continuous delivery pipeline data is provided further below. A description of the hardware configuration of continuous delivery advisor 104 is provided below in connection with FIG. 2.

System 100 is not to be limited in scope to any one particular network architecture. System 100 may include any number of computing devices 101, repositories 102, networks 103 and continuous delivery advisors 104. Furthermore, while FIG. 1 illustrates continuous delivery advisor 104 as being a separate physical device, some or all of the functionality of continuous delivery advisor 104 may reside in computing device 101.

Figure 2:
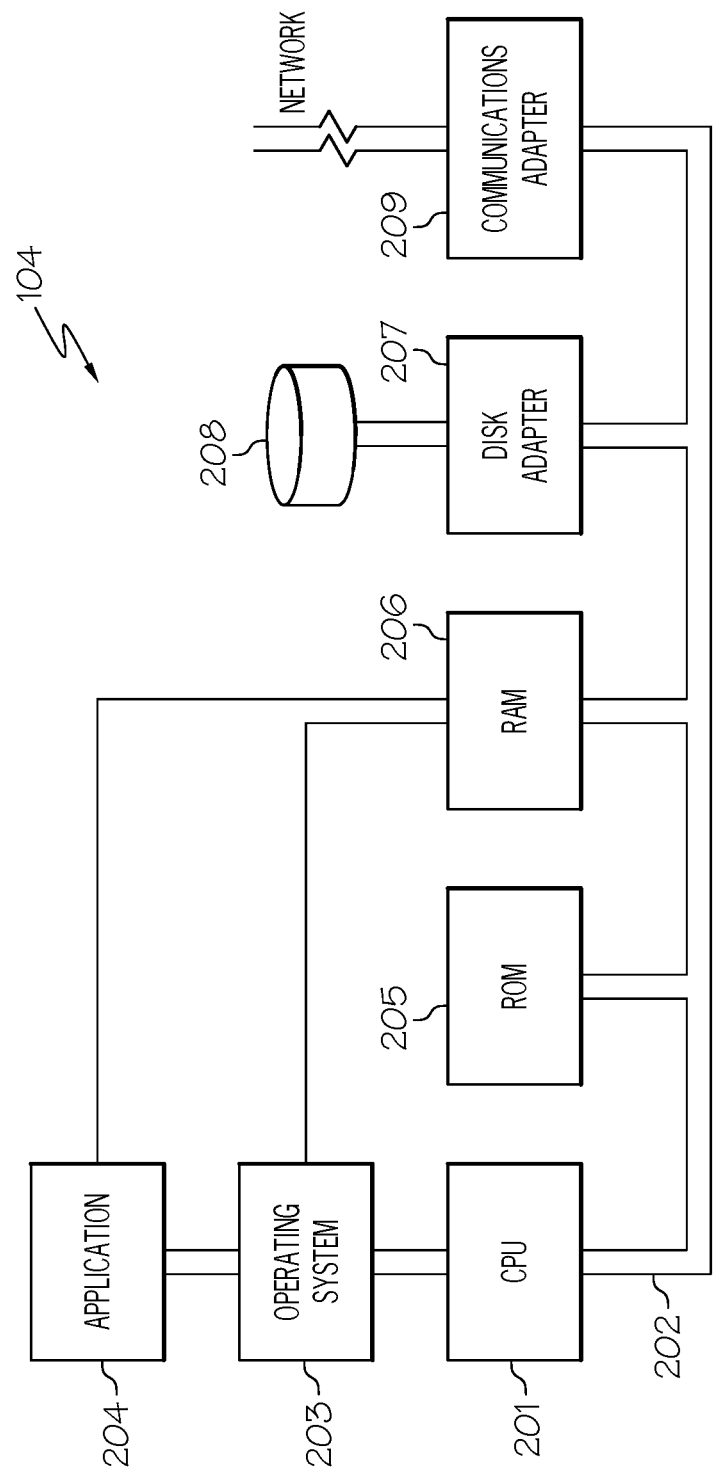
FIG. 2 illustrates an embodiment of the present invention of a hardware configuration of a continuous delivery advisor which is representative of a hardware environment for practicing the present invention.

Referring now to FIG. 2, FIG. 2 illustrates a hardware configuration of continuous delivery advisor 104 (FIG. 1) which is representative of a hardware environment for practicing the present invention. Referring to FIG. 2, continuous delivery advisor 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for providing cognitive intelligence across continuous delivery pipeline data effectively thereby limiting the failures in the continuous delivery pipeline without the previously required context switching and human layer debugging and investigation across the software delivery pipeline to detect and limit potential failures as discussed below in association with FIGS. 3-4.

Referring again to FIG. 2, read-only memory ("ROM") 205 is coupled to system bus 202 and includes a basic input/output system ("BIOS") that controls certain basic functions of continuous delivery advisor 104. Random access memory ("RAM") 206 and disk adapter 207 are also coupled to system bus 202. It should be noted that software components including operating system 203 and application 204 may be loaded into RAM 206, which may be continuous delivery advisor's 104 main memory for execution. Disk adapter 207 may be an integrated drive electronics ("IDE") adapter that communicates with a disk unit 208, e.g., disk drive. It is noted that the program for providing cognitive intelligence across continuous delivery pipeline data effectively, as discussed below in association with FIGS. 3-4, may reside in disk unit 208 or in application 204.

Continuous delivery advisor 104 may further include a communications adapter 209 coupled to bus 202. Communications adapter 209 interconnects bus 202 with an outside network (e.g., network 103 of FIG. 1) thereby allowing continuous delivery advisor 104 to communicate with computing devices 101 and repository 102.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, there are many layers in which a failure in the continuous delivery pipeline can occur, such as the application level, container environment, virtual host, hypervisor, storage, network, etc. Code is used in the form of various languages and application programming interfaces (APIs) that orchestrate the sequences of the continuous delivery pipelines. As projects mature, the layers of integration, orchestration code and dependencies between layers becomes more complex as quality gates (check on a code quality fact that must be enforced before releasing and committing to a source control) are introduced. The dependencies intertwined between layers of infrastructure code, application code and framework code grow more complex where changes of code at any of these levels can strongly influence the quality of the project as well as its delivery. Modern software pipeline development environments attempt to prevent failures in the continuous delivery pipeline by controlling all actions of the pipeline sequences through code, tool frameworks enabled through API services, quality gates and monitoring frameworks. As a result, in order to attempt to limit the failures in the continuous delivery pipeline, developers utilize context switching between multiple environments, such as an integrated development environment and a text editor. Furthermore, in an attempt to limit the failures in the continuous delivery pipeline, developers are required to possess intricate knowledge of all pipeline stages, tools, APIs, architecture, historical failures and historical root cause analysis investigations, etc. As a result, there is not currently a means for effectively limiting the failures in the continuous delivery pipeline.

The embodiments of the present invention provide a means for effectively limiting the failures in the continuous delivery pipeline by providing cognitive intelligence across continuous delivery pipeline data effectively without the previously required context switching and human layer debugging and investigation across the software delivery pipeline to detect and limit potential failures as discussed below in connection with FIGS. 3-4. By providing cognitive intelligence across continuous delivery pipeline data effectively, embodiments of the present invention determine how code changes at one stage of a continuous delivery pipeline affects another stage of the continuous delivery pipeline as discussed below in connection with FIGS. 3-4.

Figure 3:
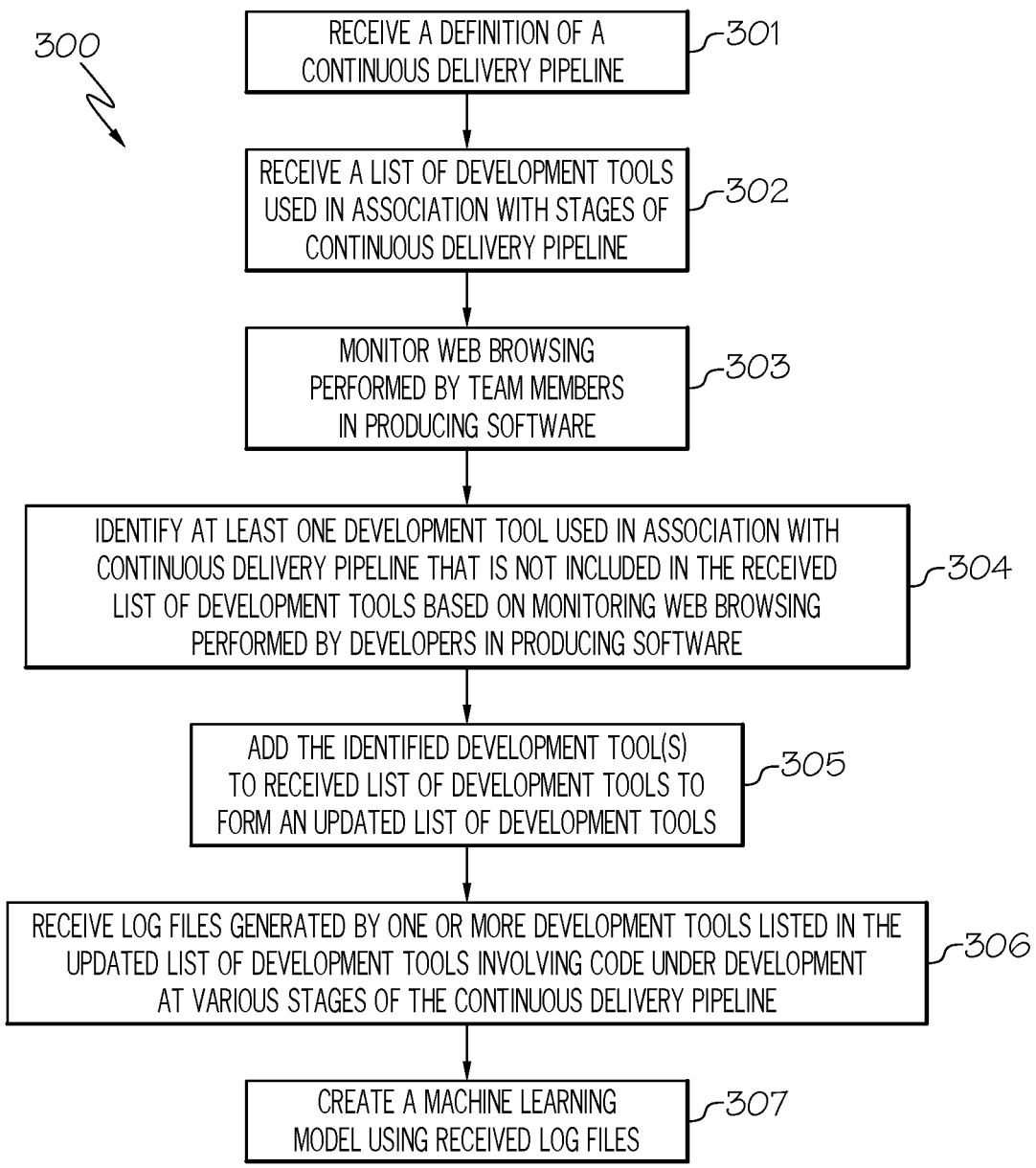
FIG. 3 is a flowchart of a method for creating a machine learning model for determining how code changes at one stage of a continuous delivery pipeline affects another stage of the continuous delivery pipeline in accordance with an embodiment of the present invention.

FIG. 3 is a flowchart of a method 300 for creating a machine learning model for determining how code changes at one stage of a continuous delivery pipeline affects another stage of the continuous delivery pipeline in accordance with an embodiment of the present invention.

Referring to FIG. 3, in conjunction with FIGS. 1-2, in step 301, continuous delivery advisor 104 receives a definition of a continuous delivery pipeline. As previously discussed, a continuous delivery pipeline breaks down the software delivery process into stages (e.g., code, build, test and deploy). For example, continuous delivery advisory 104 may receive a definition of a continuous delivery pipeline that includes a designated number of stages, such as four (e.g., code, build, test and deploy).

In step 302, continuous delivery advisor 104 receives a list of development tools (e.g., Jenkins®, Travis®, GitHub®, Subversion®, code quality services, security services, cloud infrastructures, incident response tools, project track and plan tools) used in association with the stages of continuous delivery pipeline.

In step 303, continuous delivery advisor 104 monitors web browsing performed by the team members 101 (e.g., developers) in producing software. In one embodiment, continuous delivery advisor 104 monitors the web browsing performed by the team members 101 by examining logs, recording the URLs (Uniform Resource Locators), tracking web browsing activities, tracking application usage, etc. In one embodiment, continuous delivery advisor 104 monitors web browsing performed by the team members 101 (e.g., developers) in producing software by having software (e.g., BrowseReporter by Current Ware) downloaded on computing devices 101 of the team members which sends the relevant web browsing information to continuous delivery advisor 104.

In one embodiment, continuous delivery advisor 104 monitors web browsing performed by the team members 101 (e.g., developers) in producing software by monitoring user clicks to determine pipeline context switching behavior to continually gather information about user behavior. In another embodiment, continuous delivery advisor 104 mines browser metadata for context switching for new pipeline tools not previously recognized by continuous delivery advisor 104. In a further embodiment, the sequence of steps executed by team member 101 are monitored which are used to build relationships based on code functional behavior and the continuous delivery pipeline to then create a cache of the modeled data with plugin code for orchestrating the linter. In one embodiment, the created cache is a cache in computing device 101 accessible by the team member's development environment (e.g., integrated development environment) for real time linting in the development environment based on how their code is performing in relationship to a pipeline stage.

In step 304, continuous delivery advisor 104 identifies at least one development tool used in association with the continuous delivery pipeline that is not included in the received list of development tools (see step 302) based on monitoring the web browsing performed by the team members 101 (e.g., developers) in producing software.

In step 305, continuous delivery advisor 104 adds the identified development tool(s) (those identified in step 304) to the received list of development tools to form an updated list of development tools. In this manner, continuous delivery advisor 104 is able to more accurately and completely assess the functionality of the continuous delivery pipeline since the data (e.g., log files) from all of the development tools that are being used in connection with the continuous delivery pipeline can be analyzed to determine the behavior of the code along the stages of the continuous delivery pipeline.

In step 306, continuous delivery advisor 104 receives the log files generated by one or more of the development tools listed in the updated list of development tools involving code (e.g., infrastructure code, application code, framework code) under development at various stages (e.g., test) of the continuous delivery pipeline.

In step 307, continuous delivery advisor 104 creates a machine learning model using the received log files. The machine learning model is created to predict whether changed portions of code under development at various stages of the continuous delivery pipeline will result in a pipeline failure.

A "log file," as used herein, refers to a file that records the events that occur during the production of the software during the stages of the continuous delivery pipeline. In one embodiment, a machine learning model is created that identifies the relevant log file entries that describe the behavior of the software during the stages of the continuous delivery pipeline. For example, log files generated by the development tools across systems (e.g., computing systems 101) are analyzed to build a machine learning model. In one embodiment, continuous delivery advisor 104 utilizes natural language processing to identify failures in connection with code behavior during various stages of the continuous delivery pipeline. For example, continuous delivery advisor 104 may identify pipeline failures from the log files based on keywords (e.g., failure, error) used in the log file and associate such failures with code behavior in a stage of the continuous delivery pipeline, including the test being performed at that stage (e.g., pipeline failures due to unit tests, pipeline failures due to functional tests, pipeline failures due to performance tests, pipeline failures due to security vulnerabilities). Such data may be used to train a machine learning algorithm to build a machine learning model to identify pipeline failures from the log files and associate such failures with code behavior in a stage of the continuous delivery pipeline. In this manner, the machine learning model is able to discover how code is inter-related to the pipeline stages and the steps within each stage. In particular, the machine learning model may discover how code, including changes to code, are inter-related to the tools, architecture, APIs, etc. in connection with the failures of the continuous delivery pipeline and the root cause of such failures. Such knowledge is able to provide the present invention with a more complete understanding of code behavior in the continuous delivery pipeline.

In one embodiment, such a model is stored in a storage unit (e.g., memory 205, disk unit 208) and accessible by the team member 101's development environment (e.g., integrated development environment) for discovering how their code is inter-related to the pipeline stages and the steps within each stage.

After creating the machine learning model, it may be used to determine whether changed portions of code are likely to result in continuous delivery pipeline failures as discussed below in connection with FIG. 4.

Figure 4:
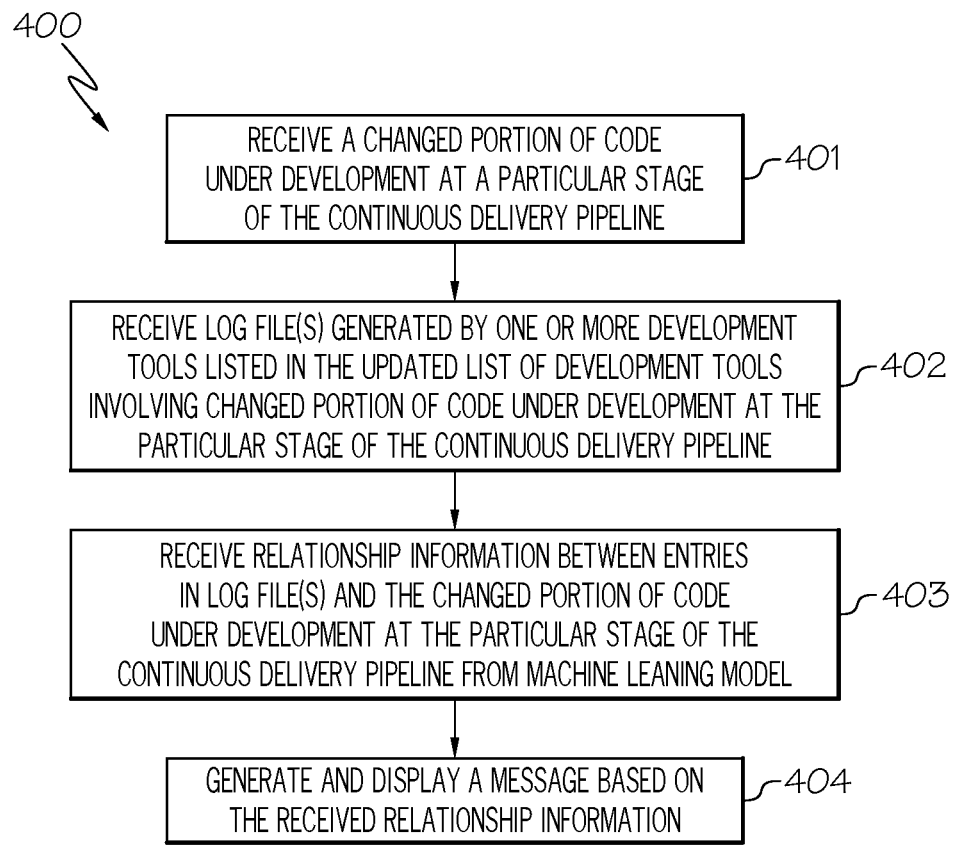
FIG. 4 is a flowchart of a method for determining whether changed portions of code are likely to result in continuous delivery pipeline failures in accordance with an embodiment of the present invention.

FIG. 4 is a flowchart of a method 400 for determining whether changed portions of code are likely to result in continuous delivery pipeline failures in accordance with an embodiment of the present invention.

Referring to FIG. 4, in conjunction with FIGS. 1-3, in step 401, continuous delivery advisor 104 receives a changed portion of code under development at a particular stage in the continuous delivery pipeline. For example, continuous delivery advisor 104 may receive a changed portion of code at the first stage of the continuous delivery pipeline.

In step 402, continuous delivery advisor 104 receives the log files generated by one or more development tools listed in the updated list of development tools involving the changed portion of code under development at the particular stage of the continuous delivery pipeline.

In step 403, continuous delivery advisor 104 receives relationship information between the entries in the log files (see step 402) and the changed portion of code under development (see step 401) at the particular stage (e.g., test) of the continuous delivery pipeline from the machine learning model. "Relationship information," as used herein, refers to information pertaining to the behavior of the changed portion of code in connection with a stage of the continuous delivery pipeline that is learned from analyzing the log file entries by the machine learning model. "Behavior," as used herein, refers to executables, outputs, results, etc. produced by the code. Such behavior is analyzed in connection with the stages of the pipeline as well as in connection with the log file entries, which may indicate potential failures.

For example, continuous delivery advisor 104 may monitor the code changes that are occurring during the continuous delivery pipeline by monitoring the code changes that appear in repository 102. Continuous delivery advisor 104 analyzes these code changes in connection with pipeline stages using the machine learning model. The machine learning model may indicate that a particular stage (e.g., test) in the continuous delivery pipeline has failed when the code is modified in such a manner in a different stage (e.g., build). The machine learning model may recommend code fixes to prevent such failures as discussed further below.

For instance, the machine learning model may indicate that the log file entries for the changed portion of code under development at this stage of the continuous delivery pipeline suggest the possibility of a future pipeline failure based on historical code behavior in the pipeline. Alternatively, the machine learning model may indicate that the log file entries for the changed portion of code under development at this stage of the continuous delivery pipeline do not suggest any likely pipeline failure based on historical code behavior in the pipeline.

In step 404, continuous delivery advisor 104 generates and displays a message, such as to a team member (e.g., user of computing device 101A) in a single working environment (e.g., integrated development environment, text editor) on computing device 101, based on the received relationship information, where the message includes a prediction or a recommendation concerning potential failures in the continuous delivery pipeline. For example, the message may provide a recommended change to the code to prevent a potential failure in the continuous delivery pipeline. Such a recommended change may be based on historical code behavior that does not result in pipeline failures. Furthermore, such a recommended change may be recommended by the machine learning model which has learned which changes to the code will result in a limited chance of pipeline failure.

In one embodiment, the message includes a prediction of whether the changed portion of code will pass a quality test at a following stage, a prediction of whether a module of the software will fail to run at a following stage, a prediction of whether a module of the software will perform incorrectly at a following stage, and/or a recommendation to one of the developers to change a different portion of code at a following stage, where the different portion of code is code other than the changed portion of code under development.

For example, continuous delivery advisor 104 may receive a changed portion of code at the first stage of the continuous delivery pipeline and generate and display a message based on the received information between a log entry in a log file (received at the second stage of the continuous delivery pipeline) and the changed portion of code at the first stage of the continuous delivery pipeline, where the first stage precedes the second stage.

The aspect of continuous delivery advisor 104 generating and displaying the message corresponds to the functionality of what is referred to herein as the "linter." The cognitive software pipeline linter is used to flag programing errors, bugs, stylistic errors, suspicious constructs, etc. as well as to suggest fixes to such problems identified through a user interface, such as the integrated development environment of computing device 101. These recommended changes to the code are to prevent the code from failing in the continuous delivery pipeline.

In one embodiment, recommended code changes are generated based on deep learning models using technologies, such as generative adversarial networks to generate the code.

In one embodiment, linting discussed above is accomplished by using a cache of deep learning of development and operations data along with the developer behavior based on project history and the pipeline sequence.

Examples of linting based on the code (changed code) in relationship to a continuous pipeline stage are provided below in connection with the various maturity levels (the complexity of the layers of integration, orchestration code and dependencies between the layers).

Depending on pipeline maturity, embodiments of the present invention can produce several permutations of functionality into the behavior of the linter as this data is unique to the project and is very difficult to generalize due to the permutations of pipeline sequences, cloud layers, language choices, infrastructure architectures, and service architectures. As a result, a few use cases of various levels of maturity to demonstrate pipeline maturity levels and results of using embodiments of the present invention are discussed below.

Use Case 1 (Pipeline Maturity Level: Low)—User changes a user interface (UI) component's source code.

Pipeline Sequence:
1.) Stage 1: code quality scan
2.) Stage 2: unit tests
3.) Stage 3: build Docker® image (container image)+push to registry
4.) Stage 4: deploy to Kubernetes® (open-source container-orchestration system) in cloud provider
5.) Performance monitoring, uptime monitoring against live system In such an example, the developer may begin to edit the code of a ReactJS component. Continuous delivery advisor 104 determines that the developer has Jest unit testing (library for testing JavaScript® code) in their source code; however, they have not updated the affected tests from their new code and are now below their code quality thresholds set by their quality gate. The linter of the present invention assists the integrated development environment (IDE) editor of the developer using the machine learning data from the historical pipeline data joined against the active sequence (the active sequence of stages of the continuous delivery pipeline) to recommend commits to meet their continuous development thresholds as well as to not reintroduce bugs that have been problematic downstream for their particular project. Furthermore, the linter of the present invention may recommend frameworks and pipeline sequence stages, such as security scans that they are missing.

Use Case 2 (Pipeline Maturity Level: Medium)—User upgrades Python™ version in a Docker® file.

Pipeline Sequence:
1.) Stage 1: code quality scan
2.) Stage 2: unit tests
3.) Stage 3: integration tests
4.) Stage 4: SAST (Static Application Security Testing) security scan
5.) Stage 5: build Docker® image+push to registry
6.) Stage 6: deploy to Kubernetes® green standby pod
7.) Stage 7: run functional verification Selenium® tests against staging pod
8.) Stage 8: Kubernetes® Istio mesh intelligent routing blue active pod traffic to green standby pod in cloud provider
9.) Performance monitoring, uptime monitoring against live system In such an example, the developer may begin to edit the code of a Docker® file which will introduce a new version of Python™ to be installed into the Docker® image that runs their application interface. Continuous delivery advisor 104 determines that this version of Python® does not yet support a library dependency their code is based on. The linter of the present invention assists the developer's development environment editor to show the relationship of the change to their application's .py file import statement knowing that this infrastructure change will break their application when deployed later in the pipeline. Embodiments of the present invention may use API relationships and library relationships joined with their application to recognize infrastructure changes that can affect their pipeline.

Use Case 3 (Pipeline Maturity Level: High)—User adds parameters to deploy.sh script (deployment script).

Pipeline Sequence:
1.) Stage 1: code quality scan
2.) Stage 2: unit tests
3.) Stage 3: integration tests
4.) Stage 4: SAST (Static Application Security Testing) security scan
5.) Stage 5: DAST (Dynamic Application Security Testing) security scan in Quality Assurance (QA)
6.) Stage 6: run functional verification Selenium® tests in QA
7.) Stage 7: build Docker® image+push to registry
8.) Stage 8: deploy to Kubernetes® green standby pod
9.) Stage 9: Interactive Application Security Testing (IAST) security testing
10.) Stage 10: Chaos Monkey testing
11.) Stage 11: Kubernetes® Istio mesh intelligent routing blue active pod traffic to green standby pod in cloud provider (subset user base routed to new feature)
12.) Performance monitoring, uptime monitoring, behavior monitoring, feature function performance monitoring, Security Information and Event Management (SIEM), database monitoring, and network monitoring
13.) Return to step 11 as many times as necessary to route all new users to the new feature. (If failures happen in 12 roll back open defect through incident response, perform Root Cause Analysis (RCA), fix code, run pipeline again)

In such an example, the developer changes their deploy.sh BASH file by adding a new set of parameters needed to pass to the Kubernetes® Yet Another Markup Language (YAML) that is used by their continuous integration (CI) job to orchestrate the deployment of their containers to the Kubernetes® cluster. The user commits this change. Embodiments of the present invention assist the developer's development environment editor to highlight and add the link to a change needed to be incorporated into their CI YAML to handle this change in order for their continuous integration (CI)/continuous delivery (CD) to not fail when it reaches the deploy stage.

In this manner, embodiments of the present invention effectively limit the failures in the continuous delivery pipeline by providing cognitive intelligence across continuous delivery pipeline data effectively without the previously required context switching and human layer debugging and investigation across the software delivery pipeline to detect and limit potential failures.

Furthermore, in this manner, the functionality or capability of computing systems is improved by possibly preventing the failure of the continuous delivery pipeline from actually occurring. Additionally, the functionality or capability of computing systems is improved by preventing a team of software engineers from spending time and utilizing computing resources (e.g., processing resources) in attempting to identify and understand the failure in the continuous delivery pipeline. By reducing the amount of computing resources being utilized by software developers from identifying and understanding the failure in the continuous delivery pipeline, computing resources (e.g., processing resource) are more efficiently utilized.

Furthermore, the present invention improves the technology or technical field involving software development. As discussed above, currently, there are many layers in which a failure in the continuous delivery pipeline can occur, such as the application level, container environment, virtual host, hypervisor, storage, network, etc. Code is used in the form of various languages and application programming interfaces (APIs) that orchestrate the sequences of the continuous delivery pipelines. As projects mature, the layers of integration, orchestration code and dependencies between layers becomes more complex as quality gates (check on a code quality fact that must be enforced before releasing and committing to a source control) are introduced. The dependencies intertwined between layers of infrastructure code, application code and framework code grow more complex where changes of code at any of these levels can strongly influence the quality of the project as well as its delivery. Modern software pipeline development environments attempt to prevent failures in the continuous delivery pipeline by controlling all actions of the pipeline sequences through code, tool frameworks enabled through API services, quality gates and monitoring frameworks. As a result, in order to attempt to limit the failures in the continuous delivery pipeline, developers utilize context switching between multiple environments, such as an integrated development environment and a text editor. Furthermore, in an attempt to limit the failures in the continuous delivery pipeline, developers are required to possess intricate knowledge of all pipeline stages, tools, APIs, architecture, historical failures and historical root cause analysis investigations, etc. As a result, there is not currently a means for effectively limiting the failures in the continuous delivery pipeline.

The present invention improves such technology by effectively limiting the failures in the continuous delivery pipeline by providing cognitive intelligence across continuous delivery pipeline data effectively without the previously required context switching and human layer debugging and investigation across the software delivery pipeline to detect and limit potential failures. By being able to effectively limit the failures in the continuous delivery pipeline, there is an improvement in the technical field of software development.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for detecting potential failures in a continuous delivery pipeline, the computer program product comprising one or more computer readable storage mediums having program code embodied therewith, the program code comprising the programming instructions for:
   creating a machine learning model to predict whether changed portions of code under development at various stages of said continuous delivery pipeline will result in a pipeline failure;
   receiving a changed portion of code under development at a particular stage of said continuous delivery pipeline;
   receiving one or more log files generated by one or more development tools involving said changed portion of code under development at said particular stage of said continuous delivery pipeline;
   receiving relationship information between entries in said one or more log files and said changed portion of code under development at said particular stage of continuous delivery pipeline from said machine learning model, wherein said relationship information comprises information pertaining to the behavior of said changed portion of code in connection with said particular stage of continuous delivery pipeline; and
   generating and displaying a message based on said received relationship information, wherein said message comprises a prediction or a recommendation concerning potential failures in said continuous delivery pipeline.

2. The computer program product as recited in claim 1, wherein the program code further comprises the programming instructions for:
   receiving a list of development tools used in association with stages of said continuous delivery pipeline;
   monitoring web browsing performed by a plurality of users in producing software; and
   identifying at least one development tool used in association with said continuous delivery pipeline that is not included in said received list of development tools based on said monitoring of said web browsing performed by said plurality of users in producing software.

3. The computer program product as recited in claim 2, wherein said stages of said continuous delivery pipeline comprise code, build, test and deploy.

4. The computer program product as recited in claim 2, wherein the program code further comprises the programming instructions for:
   adding said identified at least one development tool to said list of development tools to form an updated list of development tools.

5. The computer program product as recited in claim 4, wherein the program code further comprises the programming instructions for:
   receiving log files generated by one or more development tools listed in said updated list of development tools involving code under development at various stages of said continuous delivery pipeline.

6. The computer program product as recited in claim 5, wherein the program code further comprises the programming instructions for:
   creating said machine learning model using said received log files.

7. The computer program product as recited in claim 1, wherein said change to said portion of code under development is received at a first stage of said continuous delivery pipeline, wherein a log entry in a log file of said one or more log files is received at a second stage, wherein said first stage precedes said second stage.

8. The computer program product as recited in claim 1, wherein said message is one of the following: a prediction of whether said changed portion of code will pass a quality test at a following stage, a prediction of whether a module of software will fail to run at a following stage, a prediction of whether a module of software will perform incorrectly at a following stage, and a recommendation to one of a plurality of users to change a different portion of code at a following stage, wherein said different portion of code being code other than said changed portion of code under development.

9. The computer program product as recited in claim 1, wherein said changed portion of code under development comprises one of the following: an infrastructure code, an application code and a framework code.

10. The computer program product as recited in claim 1, wherein said message is generated in one of the following environments: an integrated development environment and a text editor.

11. A system, comprising:
   a memory for storing a computer program for detecting potential failures in a continuous delivery pipeline; and
   a processor connected to the memory, wherein the processor is configured to execute the program instructions of the computer program comprising:
      creating a machine learning model to predict whether changed portions of code under development at various stages of said continuous delivery pipeline will result in a pipeline failure;
      receiving a changed portion of code under development at a particular stage of said continuous delivery pipeline;
      receiving one or more log files generated by one or more development tools involving said changed portion of code under development at said particular stage of said continuous delivery pipeline;
      receiving relationship information between entries in said one or more log files and said changed portion of code under development at said particular stage of continuous delivery pipeline from said machine learning model, wherein said relationship information comprises information pertaining to the behavior of said changed portion of code in connection with said particular stage of continuous delivery pipeline; and generating and displaying a message based on said received relationship information, wherein said message comprises a prediction or a recommendation concerning potential failures in said continuous delivery pipeline.

12. The system as recited in claim 11, wherein the program instructions of the computer program further comprise:

receiving a list of development tools used in association with stages of said continuous delivery pipeline;

monitoring web browsing performed by a plurality of users in producing software; and identifying at least one development tool used in association with said continuous delivery pipeline that is not included in said received list of development tools based on said monitoring of said web browsing performed by said plurality of users in producing software.

13. The system as recited in claim 12, wherein said stages of said continuous delivery pipeline comprise code, build, test and deploy.

14. The system as recited in claim 12, wherein the program instructions of the computer program further comprise:

adding said identified at least one development tool to said list of development tools to form an updated list of development tools.

15. The system as recited in claim 14, wherein the program instructions of the computer program further comprise:

receiving log files generated by one or more development tools listed in said updated list of development tools involving code under development at various stages of said continuous delivery pipeline.

16. The system as recited in claim 15, wherein the program instructions of the computer program further comprise:

creating said machine learning model using said received log files.

17. The system as recited in claim 11, wherein said change to said portion of code under development is received at a first stage of said continuous delivery pipeline, wherein a log entry in a log file of said one or more log files is received at a second stage, wherein said first stage precedes said second stage.

18. The system as recited in claim 11, wherein said message is one of the following: a prediction of whether said changed portion of code will pass a quality test at a following stage, a prediction of whether a module of software will fail to run at a following stage, a prediction of whether a module of software will perform incorrectly at a following stage, and a recommendation to one of a plurality of users to change a different portion of code at a following stage, wherein said different portion of code being code other than said changed portion of code under development.

19. The system as recited in claim 11, wherein said changed portion of code under development comprises one of the following: an infrastructure code, an application code and a framework code.

20. The system as recited in claim 11, wherein said message is generated in one of the following environments: an integrated development environment and a text editor.

* * * * *